(12) United States Patent
Takeshita et al.

(10) Patent No.: US 7,515,168 B2
(45) Date of Patent: Apr. 7, 2009

(54) LASER SCANNING OPTICAL APPARATUS HAVING EXCLUSIVE OPTICAL ELEMENTS AT VARYING DISTANCES FROM RECEIVING SURFACES

(75) Inventors: Kenji Takeshita, Toyokawa (JP); Atsushi Ohata, Tokyo (JP); Hajime Taniguchi, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 143 days.

(21) Appl. No.: 11/519,769

(22) Filed: Sep. 13, 2006

(65) Prior Publication Data
US 2007/0120944 A1    May 31, 2007

(30) Foreign Application Priority Data
Nov. 28, 2005    (JP)    ............................. 2005-342918

(51) Int. Cl.
*B41J 15/14* (2006.01)
*B41J 27/00* (2006.01)

(52) U.S. Cl. ...................................... 347/244; 347/258
(58) Field of Classification Search ................. 347/233, 347/238, 241, 244, 256–258, 242; 359/205, 359/662
See application file for complete search history.

(56) References Cited

U.S. PATENT DOCUMENTS 6,734,890 B2    5/2004    Takeuchi et al.
6,987,593 B2 *  1/2006    Hayashi et al. ............. 359/205
7,230,638 B2 *  6/2007    Fukutomi ................... 347/243
2003/0210324 A1 * 11/2003  Sung et al. ................. 347/241

FOREIGN PATENT DOCUMENTS

| JP | 2000-180749 A |   | 6/2000 |
| JP | 2003-005113 A |   | 1/2003 |
| JP | 2003211728 A  | * | 7/2003 |
| JP | 2004-226497 A |   | 8/2004 |

\* cited by examiner

*Primary Examiner*—Hai C Pham
(74) *Attorney, Agent, or Firm*—Buchanan Ingersoll & Rooney PC

(57) ABSTRACT

A laser scanning optical apparatus wherein a plural number of beams are deflected by one polygon mirror and are scanned on respective corresponding photosensitive drums via a scanning optical system. The scanning optical system has a first scanning lens which transmits all the beams, exclusive second scanning lenses which transmit exclusively the respective beams and plane mirrors for reflecting the beams. The second scanning lenses are located such that at least one of the second scanning lenses is at a distance from the corresponding photosensitive drum on which the beam transmitted by the at least one of the second scanning lenses is scanned and that another second scanning lens is at another distance from the corresponding photosensitive drum on which the beams transmitted by the another second scanning lens is scanned. For example, at least one of the exclusive optical elements is at a distance from the corresponding photosensitive drum, and the other exclusive optical elements are at another distance from the respective corresponding photosensitive drums. Alternatively, the exclusive optical elements are at mutually different distances from the respective corresponding photosensitive drums.

6 Claims, 6 Drawing Sheets

LASER SCANNING OPTICAL APPARATUS HAVING EXCLUSIVE OPTICAL ELEMENTS AT VARYING DISTANCES FROM RECEIVING SURFACES

This application is based on Japanese Patent Application No. 2005-342918 filed on Nov. 28, 2005, the content of which is incorporated herewith by reference.

BACKGROUND OF THE INVENTION

1. Field of the Invention

The present invention relates to a laser scanning optical apparatus, and more particularly to a laser scanning optical apparatus to be employed for a color image forming apparatus such as an electrophotographic copying machine, a printer or the like.

2. Description of Related Art

In recent years, full-color electrophotographic image forming apparatuses, such as copying machines and printers, are generally of a tandem type, wherein four photosensitive drums for Y (yellow), M (magenta), C (cyan) and K (black) respectively are arranged in parallel, and four color images formed on the respective photosensitive drums are transferred onto an intermediate transfer member to be combined with each other.

Japanese Patent Laid-Open Publications No. 2003-5113 (reference 1) and No. 2004-226497 (reference 2) suggest a structure for a laser scanning optical apparatus to be employed for an image forming apparatus of this tandem type. In the structure suggested by these publications, four beams are converged on a single polygon mirror and concurrently deflected (so-called one-side deflection method). Accordingly, in the scanning optical system, four optical paths are formed, and the scanning optical system has a common scanning lens which is commonly used for the four optical paths and four exclusive scanning lenses which are used exclusively for the respective optical paths. The distances between the respective exclusive scanning lenses and the respective corresponding photosensitive drums are equal to one another.

Japanese Patent Laid-Open Publication No. 2000-180749 (reference 3) discloses that optical paths have mutually different magnifications in a sub-scanning direction and that the last optical elements (optical elements closest to the respective photosensitive drums) in the respective optical paths are plane mirrors.

FIG. 6 generally shows the structure of a laser scanning optical apparatus suggested by the references 1 and 2. In this laser scanning optical apparatus 100, laser beams deflected by a polygon mirror 101 pass through a common scanning lens 102 and are reflected by plane mirrors 104Y, 104M, 105M, 104C, 105C, 104K and 105K, respectively. Then, the laser beams pass through exclusive scanning lenses 103Y, 103M, 103C and 103K and irradiate photosensitive drums 110Y, 110M, 110C and 110K, respectively.

Such an image forming apparatus of the tandem type is often used in a monochromatic print mode, and therefore, a toner hopper 111K in a black image forming unit is larger than toner hoppers 111Y, 111M and 111C in the other image forming units. Additionally, a refuse toner bottle (not shown) in the black image forming unit is larger than those in the other image forming units.

In the laser scanning optical apparatus 100 shown by FIG. 6, it is a premise that the distances between the last optical elements in the respective optical paths and the corresponding photosensitive drums, namely, the distance between the exclusive scanning lens 103Y and the photosensitive drum 110Y, the distance between the exclusive scanning lens 103M and the photosensitive drum 110M, the distance between the exclusive scanning lens 103C and the photosensitive drum 110C and the distance between the exclusive scanning lens 103K and the photosensitive drum 110K are equal to one another. Therefore, when the black image forming unit is designed to be larger than the other image forming units, a dead space D is made between the laser scanning optical apparatus 100 and the image forming units, which results in an increase in the size of the image forming apparatus.

When plane mirrors with no optical powers are arranged as the last elements in the respective optical paths, the magnifications in the sub-scanning direction of the respective optical paths are naturally large, and the common scanning lens must be wide. This results in a rise in cost and becomes a bar to division into the optical paths. This problem will be described later with reference to FIG. 5.

SUMMARY OF THE INVENTION

An object of the present invention is to provide a laser scanning optical apparatus of a tandem type which contributes to downsizing of an image forming apparatus by not forming an unnecessary space between the laser scanning optical apparatus and image forming units.

Further, another object of the present invention is to provide a laser scanning optical apparatus which has high performance in color reproduction as well as which can attain the object above.

In order to attain the objects above, the present invention provides a laser scanning optical apparatus wherein a plural number of beams are deflected by a single deflector and scanned on corresponding receiving surfaces via a scanning optical system, wherein: the scanning optical system comprises exclusive optical elements for exclusively transmitting the respective beams, each of the exclusive optical elements having at least one non-plane surface, in an end portion of the scanning optical system; and the exclusive optical elements are located such that at least one of the exclusive optical elements is at a distance from the receiving surface on which the beam transmitted by the at least one of the exclusive optical elements is scanned and that another of the exclusive optical elements is at another distance from the receiving surface on which the beam transmitted by the another of the exclusive optical elements is scanned.

In the laser scanning optical apparatus according to the present invention, exclusive optical elements, each of which has at least one non-plane surface, are located in an end portion of the scanning optical system. At least one of the exclusive optical elements is at a distance from the receiving surface on which the beam transmitted by the at least one of the exclusive optical elements is scanned, and another of the exclusive optical elements is at another distance from the receiving surface on which the beam transmitted by the another of the exclusive optical elements is scanned. Therefore, the degree of freedom in arranging the exclusive optical elements is high, and it is not necessary to make the dead space between the image forming units and the laser scanning optical system, which contributes to downsizing of the image forming apparatus.

In the laser scanning optical apparatus according to the present invention, preferably, the exclusive optical elements have powers mainly in a sub-scanning direction. With this arrangement, an optical element which transmits all the beams is not required to have a large magnification in the sub-scanning direction and accordingly is not required to have a large width in the sub-scanning direction. This results in a reduction in cost and easy division into optical paths.

In the laser scanning optical apparatus according to the present invention, the exclusive optical elements may be located such that at least one of the exclusive optical elements is at a distance from the receiving surface on which the beam transmitted by the at least one of the exclusive optical elements is scanned and that the other exclusive optical elements are at another distance from the respective receiving surfaces on which the beams transmitted respectively by the other exclusive optical elements are scanned. Alternatively, the exclusive optical elements are located such that the exclusive optical elements are at mutually different distances from the respective receiving surfaces on which the beams transmitted respectively by the exclusive optical elements are scanned. In the latter case, the distances between the exclusive optical elements and the respective receiving surfaces may be increasing or decreasing in a direction in which the receiving surfaces are arranged.

Further, a case holding the scanning optical system has a bearing surface to be fitted to an image forming apparatus body, and the bearing surface may tilt from a plane including axes of the receiving surfaces.

BRIEF DESCRIPTION OF THE DRAWINGS

These and other objects of the present invention will be apparent from the following description with reference to the accompanying drawings, in which.

DETAILED DESCRIPTION OF THE PREFERRED EMBODIMENTS

Laser scanning optical apparatuses according to the preferred embodiments of the present invention are described with reference to the accompanying drawings.

First Embodiment

Figure 1:
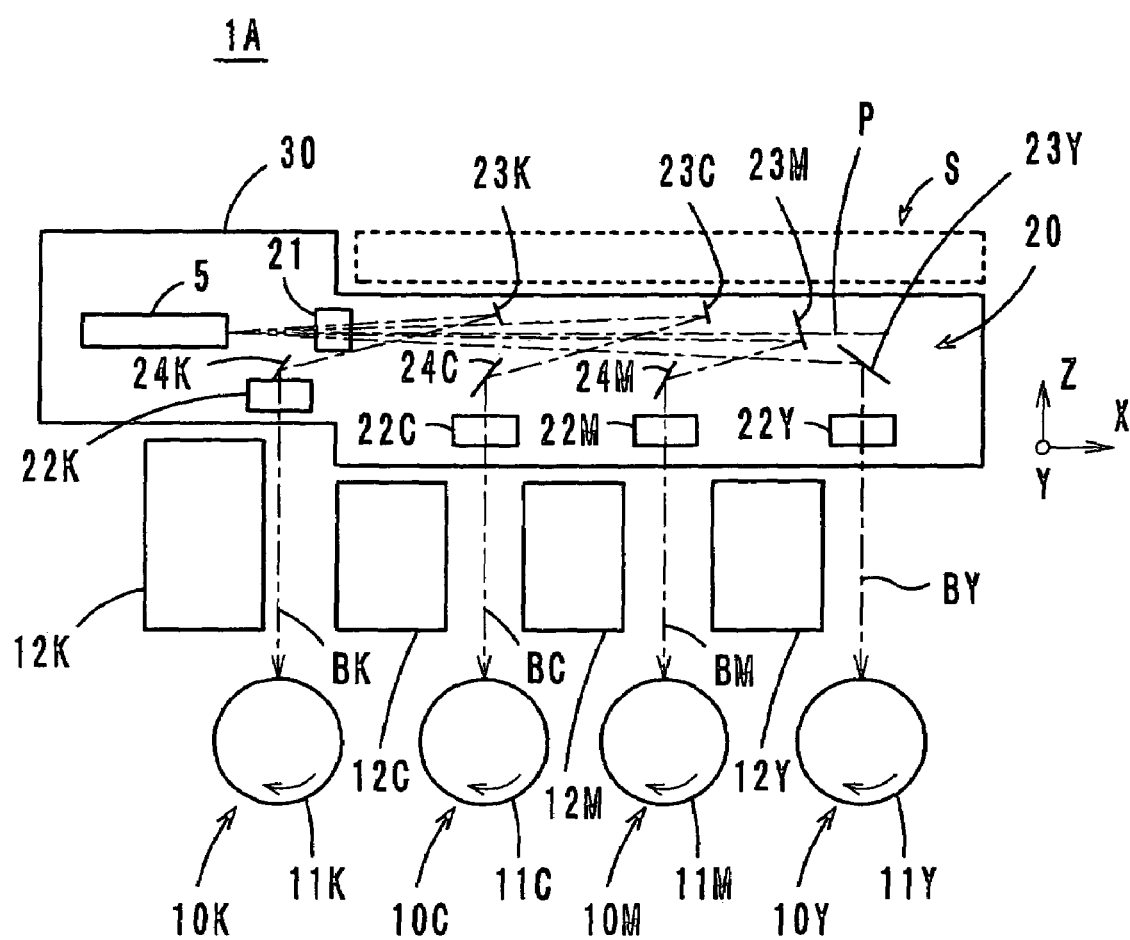
FIG. 1 is a schematic view of a structure according to a first embodiment of the present invention.
Figure 2:
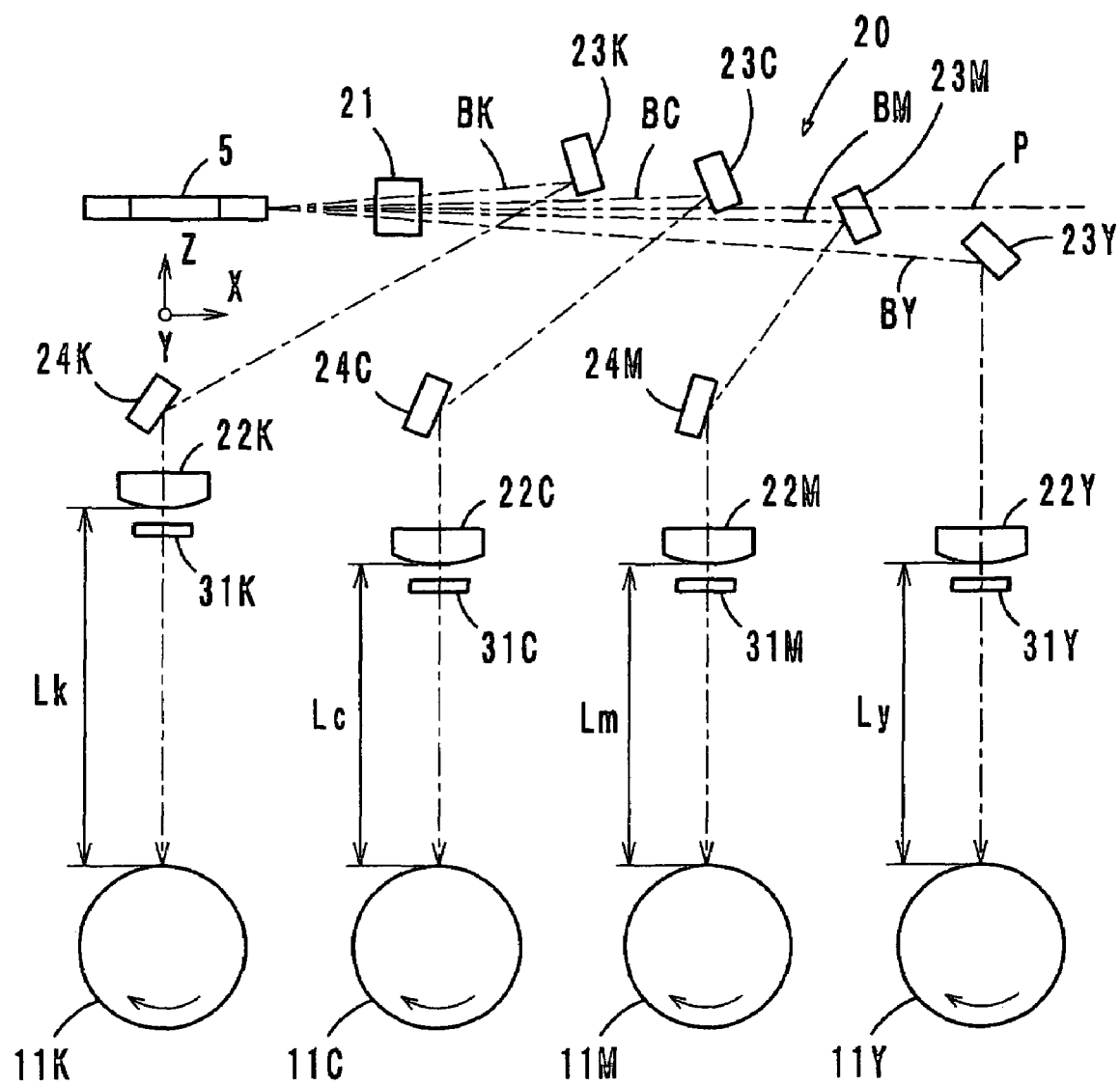
FIG. 2 is a structural view of a scanning optical system according to the first embodiment.

See FIGS. 1 and 2

FIGS. 1 and 2 show a laser scanning optical apparatus 1A according to a first embodiment of the present invention. The laser scanning optical apparatus 1A is used for image exposure in an electrophotographic image forming apparatus of a tandem type. The apparatus 1A has four image forming units 10Y, 10M, 10C and 10K which are arranged in parallel, and laser beams BY, BM, BC and BK are scanned on photosensitive drums 11Y, 11M, 11C and 11K which are provided in the image forming units 10Y, 10M, 10C and 10K, respectively. By the laser beam scanning, images (electrostatic latent images) are formed on the photosensitive drums 11Y, 11M, 11C and 11K and are developed into a yellow, a magenta, a cyan and a black toner image. These toner images are transferred onto an intermediate transfer member (not shown) and combined (first transfer), and the thus made composite image is transferred onto a transfer paper (second transfer). This image forming process by use of an image forming apparatus of the tandem type is well-known, and a detailed description thereof is omitted.

The laser scanning optical apparatus 1A comprises a light source unit (not shown) comprising four laser diodes, a polygon mirror 5 and a scanning optical system 20 forming four optical paths from the polygon mirror to the photosensitive drums 11Y, 11M, 11C and 11K. The scanning optical system 20 comprises a scanning lens (first lens 21) which is commonly used for the four optical paths, plane mirrors 23Y, 23M, 24M, 23C, 24C, 23K and 24K, and exclusive scanning lenses (second lenses 22Y, 22M, 22C and 22K) which are located at an end portion of the scanning optical system 20 and are exclusively used for the respective optical paths.

Laser beams emitted from the light source are incident to the polygon mirror 5 at respectively specified angles in a sub-scanning direction Z, and as the polygon mirror 5 is rotating, the laser beams are deflected at an equiangular velocity in a main scanning direction Y. In FIGS. 1 and 2, the reference marks "BY", "BM", "BC" and "BK" denote beams deflected by the polygon mirror 5, and the reference mark "P" denotes the optical axis of the scanning optical system 20. The first and second lenses 21, 22Y, 22M, 22C and 22K give f θ characteristics to the beams and correct aberrations.

The laser beams BY, BM, BC and BK pass through the first lens 21. Thereafter, the beam BY is reflected by the plane mirror 23Y, passes through the second lens 22Y and irradiates the photosensitive drum 11Y. The beam BM are reflected by the plane mirrors 23M and 24M, passes through the second lens 22M and irradiates the photosensitive drum 11M. The beam BC is reflected by the plane mirrors 23C and 24C, passes through the second lens 22C and irradiates the photosensitive drum 11. The beam BK are reflected by the plane mirrors 23K and 24K, passes through the second lens 22K and irradiates the photosensitive drum 11K.

Because the image forming apparatus 1A is often used in a monochromatic mode, the black image forming unit 10K for forming black images has a larger toner hopper 12K, and the black image forming unit 10K is larger than the other image forming units 10Y, 10M and 10C for forming color images. In the first embodiment, the distance Ly between the second lens 22Y and the photosensitive drum 11Y, the distance Lm between the second lens 22M and the photosensitive drum 11M and the distance Lc between the second lens 22C and the photosensitive drum 11C are equal to one another, while the second lens 22K is positioned such that the distance Lk between the lens 22K and the photosensitive drum 11K is larger then the distances Ly, Lm and Lc (Lk>Ly=Lm=Lc).

Figure 6:
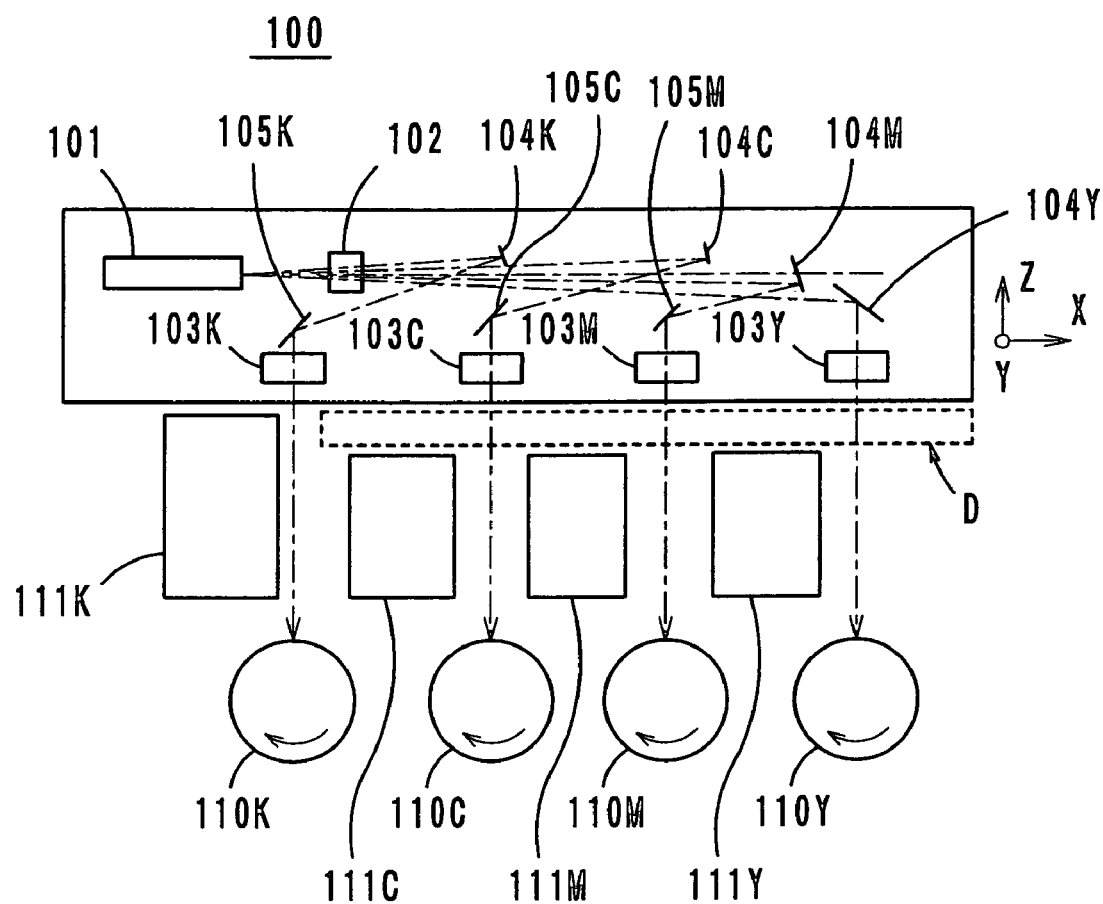
FIG. 6 is a schematic view of a conventional laser scanning optical apparatus.

By arranging the second lenses 22Y, 22M, 22C and 22K in this way, the dead space D as shown in FIG. 6 is not made. By making an improvement to the shape of a case 30, a space S (see FIG. 1) is made instead. The space S is made above the case 30, in other words, above the image forming apparatus body, and therefore, the space S is used, for example, as an ejection tray for receiving printed papers. Thus, the space S does not become a dead space, and this contributes to downsizing of the image forming apparatus. The case 30 has dust-proof window glasses 31Y, 31M, 31C and 31K (see FIG. 2). However, these window glasses 31Y, 31M, 31C and 31K are not indispensable.

Second Embodiment

Figure 3:
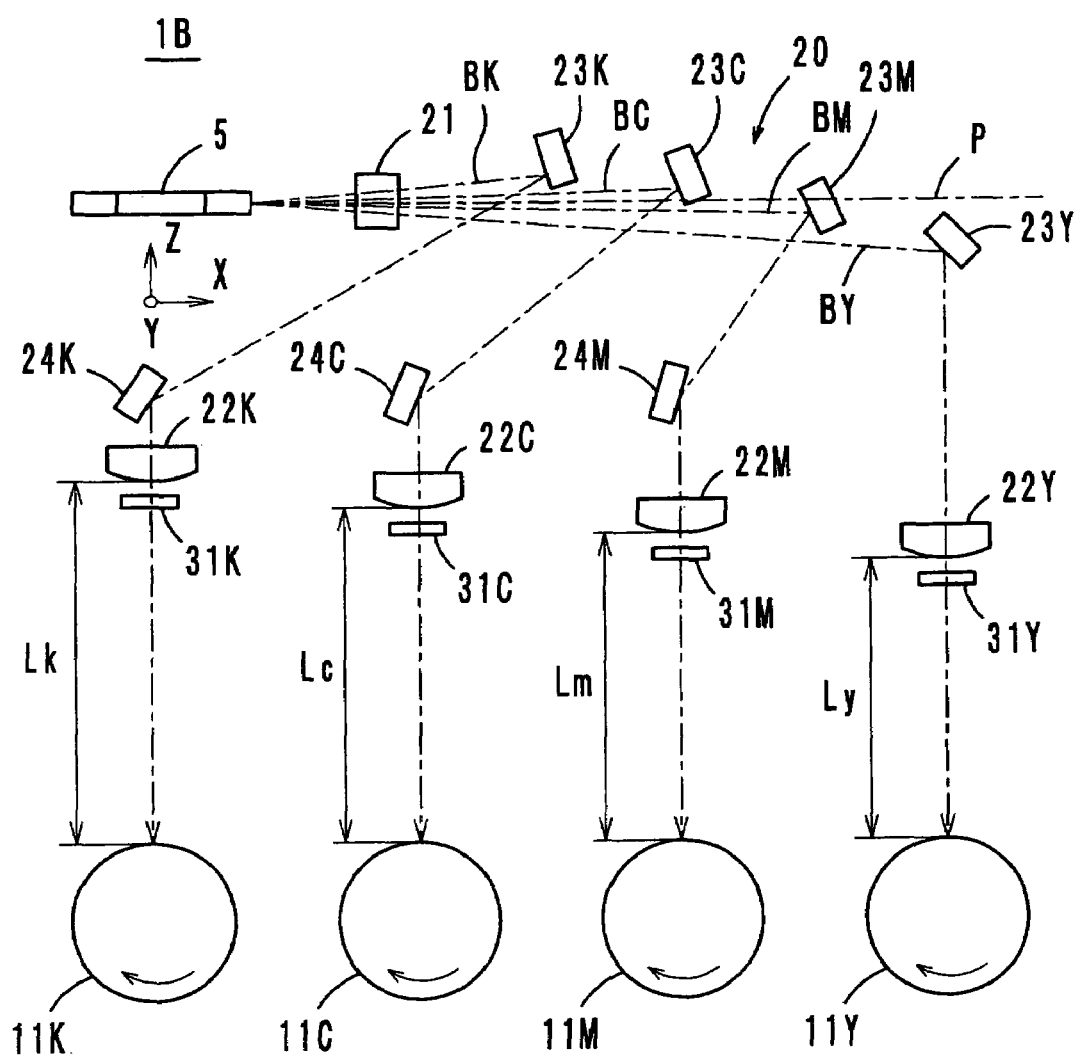
FIG. 3 is a schematic view of a structure according to a second embodiment of the present invention.
Figure 4:
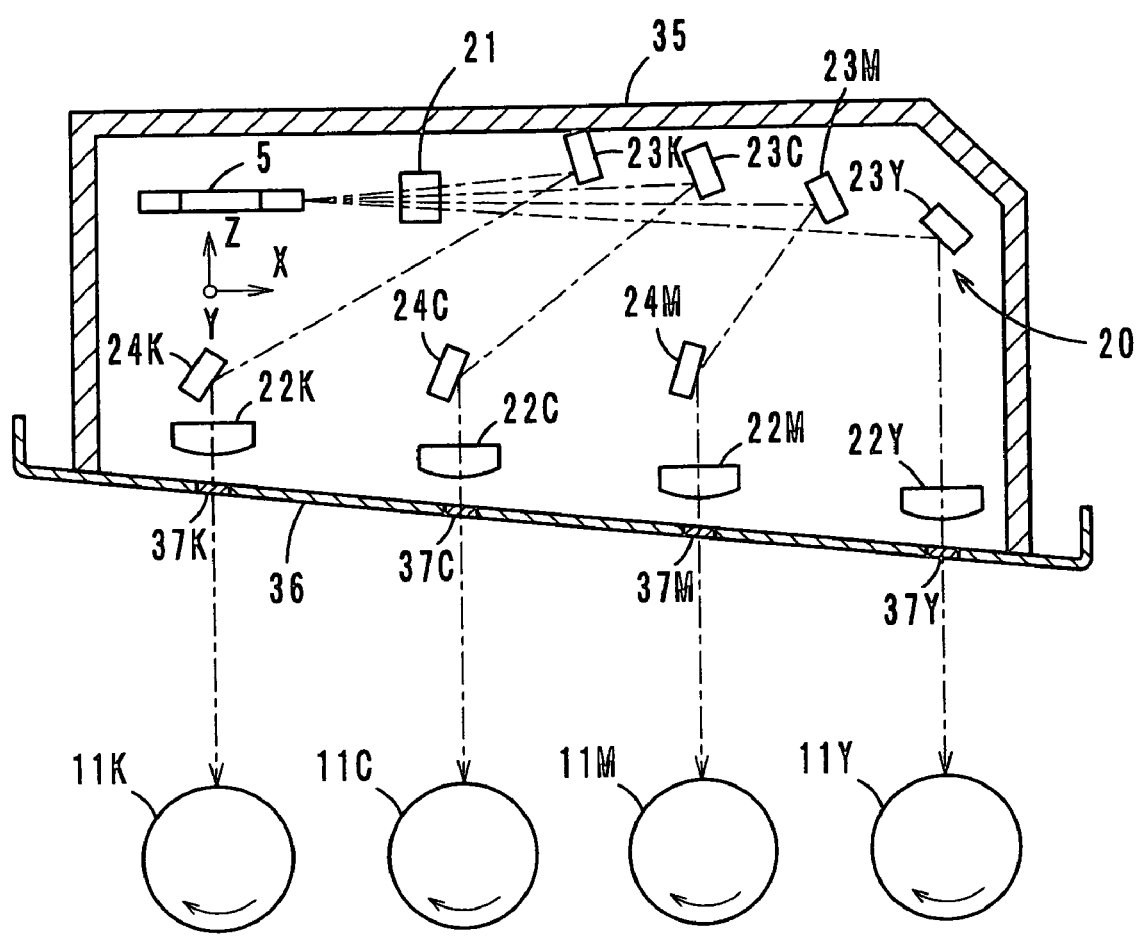
FIG. 4 is a sectional view of a case according to the second embodiment.

See FIGS. 3 and 4

FIGS. 3 and 4 show a laser scanning optical apparatus 1B according to a second embodiment of the present invention. In the second embodiment, the second lenses 22Y, 22M, 22C and 22K are located such that the distance Ly between the lens 22Y and the photosensitive drum 11Y, the distance Lm between the lens 22M and the photosensitive drum 11M, the distance Lc between the lens 22C and the photosensitive drum 11C and the distance Lk between the lens 22K and the photosensitive drum 11K are mutually different, and more specifically, Ly<Lm<Lc<Lk. Other parts and other members of the laser scanning optical apparatus 1B are the same as those of the laser scanning optical apparatus 1A according to the first embodiment. The same parts and the same members are provided with the same reference marks, and descriptions thereof are omitted.

In the second embodiment, further, as shown in FIG. 4, the bottom of a case 35 holding the optical elements tilts at an angle in accordance with the levels of the second lenses 22Y, 22M, 22C and 22K, and a table 36 is provided. The table 36 serves as a bearing surface and is fitted to a frame (not shown) of an image forming apparatus body. The table 36 has dust-proof window glasses 37Y, 37M, 37C and 37K, which are to transmit beams BY, BM, BC and BK.

According to the second embodiment, the distances between the second lenses 22Y, 22M, 22C and 22K and the corresponding photosensitive drums 11Y, 11M, 11C and 11K are increasing in the arranging direction of the photosensitive drums, and therefore, the aberration dislocation (color dislocation) among the laser beams BY, BM, BC and BK is not apparent.

Because the bottom of the table 36 is a tilting flat surface with no steps, air flows smoothly in the image forming apparatus body, and fouling due to dispersed toner and paper dust can be suppressed. Although FIG. 3 shows an example wherein Ly<Lm<Lc<Lk, the second lenses 22Y, 22M, 22C and 22K may be positioned such that Ly>Lm>Lc>Lk. Also, the second lenses 22Y, 22M, 22C and 22K may be positioned such that the distaces Ly, Lm, Lc and Lk are mutually different at random.

Powers of the Second Lenses; See FIGS. 5a and 5b

Figure 5A:
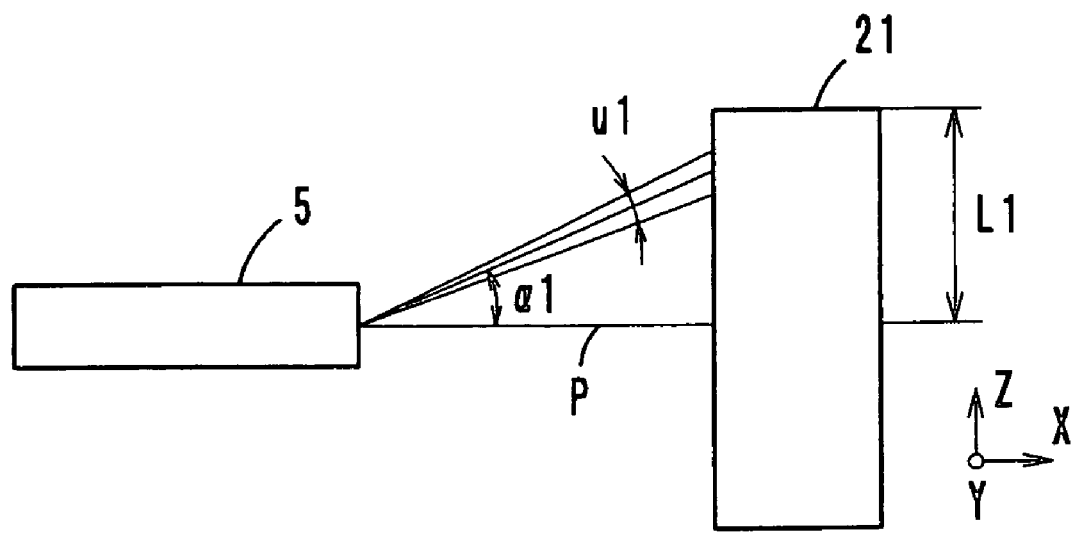
FIGS. 5a and 5b are illustrations showing the relationship between the magnification in a sub-scanning direction and the width of a first lens.
Figure 5B:
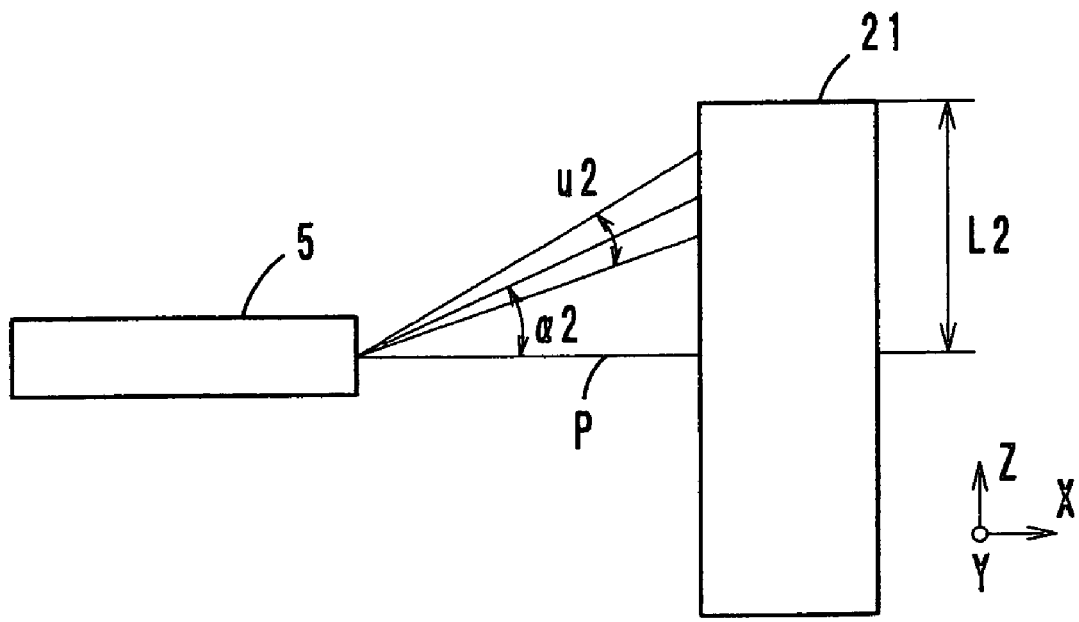

In the first and second embodiments, the respective exit surfaces of the second lenses (the fourth surfaces in the respective optical paths) have powers in the sub-scanning direction. Referring to FIGS. 5a and 5b, the relationship between the width L of the first lens 21 from the optical axis P and the magnification in the sub-scanning direction Z of the first lens 21 is studied. Comparing the case wherein the absolute value of the magnification is smaller (see FIG. 5a) with the case wherein the absolute value of the magnification is larger (see FIG. 5b), the angles of deflection in the former case are smaller than those in the latter case ($\alpha1<\alpha2$, $u1<u2$), and accordingly, the width of the first lens 21 in the former case is smaller than that in the latter case (L1<L2).

By using lenses having powers in the sub-scanning direction as the second lenses, it becomes possible to lower the magnification in the sub-scanning direction Z of the first lens 21, and the first lens 21 does not need to have the width L2 and merely needs to have the width L1. Thus, the first lens 21 can be fabricated at low cost, and also, division into four optical paths is easy. Further, the entrance surfaces of the second lenses (the third surfaces of the respective optical paths) may have powers in the sub-scanning direction.

Construction Data of the Scanning Optical System

Next, construction data of the scanning optical systems in the first and second embodiments are shown. In the construction data, free curved surfaces are calculated by the following expression (1).

$$X = \sum_i \sum_j C_{ij} \cdot Y^i \cdot Z^j \tag{1}$$

Tables 1-4 show the construction data regarding the first embodiment, and Tables 5-8 show free curved surface data of the first and second lenses in the respective optical paths.

TABLE 1

| | | | Construction Data Yellow | | | |
| NAME | SURFACE NO. | RADIUS OF CURVATURE | COORDINATES OF SURFACE VERTEX | | | REFRACTIVE INDEX |
| | | | X | Y | Z | |
|---|---|---|---|---|---|---|
| FIRST LENS | 1 | FREE | 25.000 | 0.000 | 0.000 | |
| | | | | | | 1.572 |
| | 2 | FREE | 31.000 | 0.000 | 0.000 | |
| | | | | | | air |
| SECOND LENS | 3 | INF | 152.269 | 0.000 | −6.382 | |
| | | | | | | 1.525 |
| | 4 | FREE | 156.269 | 0.000 | −6.382 | |
| | | | | | | air |
| WINDOW GLASS | 5 | INF | 166.269 | 0.000 | −6.382 | |
| | | | | | | 1.511 |
| | 6 | INF | 168.047 | 0.000 | −6.107 | |
| | | | | | | air |
| PHOTO-SENSITIVE DRUM | | INF | 238.069 | 0.000 | 0.000 | |

TABLE 1-continued

| | | Eccentricity Data | | |
|---|---|---|---|---|
| SURFACE | | VECTOR | | |
| NO. | AXIS | X COMPONENT | Y COMPONENT | Z COMPONENT |
| 5 | X | 0.9882 | 0 | 0.153 |
| | Y | 0 | 1 | 0 |
| 6 | X | 0.9882 | 0 | 0.153 |
| | Y | 0 | 1 | 0 |

TABLE 2

Construction Data
Magenta

| NAME | SURFACE NO. | RADIUS OF CURVATURE | COORDINATES OF SURFACE VERTEX | | | REFRACTIVE INDEX |
|---|---|---|---|---|---|---|
| | | | X | Y | Z | |
| FIRST LENS | 1 | FREE | 25.000 | 0.000 | 0.000 | 1.572 |
| | 2 | FREE | 31.000 | 0.000 | 0.000 | air |
| SECOND LENS | 3 | INF | 152.269 | 0.000 | −2.658 | 1.525 |
| | 4 | FREE | 156.269 | 0.000 | −2.658 | air |
| WINDOW GLASS | 5 | INF | 166.269 | 0.000 | −2.658 | 1.511 |
| | 6 | INF | 168.047 | 0.000 | −2.933 | air |
| PHOTO-SENSITIVE DRUM | | INF | 238.069 | 0.000 | 0.000 | |

| | | Eccentricity Data | | |
|---|---|---|---|---|
| SURFACE | | VECTOR | | |
| NO. | AXIS | X COMPONENT | Y COMPONENT | Z COMPONENT |
| 5 | X | 0.9882 | 0 | −0.153 |
| | Y | 0 | 1 | 0 |
| 6 | X | 0.9882 | 0 | −0.153 |
| | Y | 0 | 1 | 0 |

TABLE 3

Construction Data
Cyan

| NAME | SURFACE NO. | RADIUS OF CURVATURE | COORDINATES OF SURFACE VERTEX | | | REFRACTIVE INDEX |
|---|---|---|---|---|---|---|
| | | | X | Y | Z | |
| FIRST LENS | 1 | FREE | 25.000 | 0.000 | 0.000 | 1.572 |
| | 2 | FREE | 31.000 | 0.000 | 0.000 | air |
| SECOND LENS | 3 | INF | 152.269 | 0.000 | 2.658 | 1.525 |
| | 4 | FREE | 156.269 | 0.000 | 2.658 | air |
| WINDOW GLASS | 5 | INF | 166.269 | 0.000 | 2.658 | 1.511 |
| | 6 | INF | 168.047 | 0.000 | 2.382 | air |
| PHOTO-SENSITIVE DRUM | | INF | 238.069 | 0.000 | 0.000 | |

TABLE 3-continued

Eccentricity Data

| SURFACE NO. | AXIS | VECTOR | | |
|---|---|---|---|---|
| | | X COMPONENT | Y COMPONENT | Z COMPONENT |
| 5 | X | 0.9882 | 0 | −0.153 |
| | Y | 0 | 1 | 0 |
| 6 | X | 0.9882 | 0 | −0.153 |
| | Y | 0 | 1 | 0 |

TABLE 4

Construction Data
Black

| NAME | SURFACE NO. | RADIUS OF CURVATURE | COORDINATES OF SURFACE VERTEX | | | REFRACTIVE INDEX |
|---|---|---|---|---|---|---|
| | | | X | Y | Z | |
| FIRST LENS | 1 | FREE | 25.000 | 0.000 | 0.000 | |
| | | | | | | 1.572 |
| | 2 | FREE | 31.000 | 0.000 | 0.000 | |
| | | | | | | air |
| SECOND LENS | 3 | INF | 142.969 | 0.000 | 5.992 | |
| | | | | | | 1.525 |
| | 4 | FREE | 146.969 | 0.000 | 5.992 | |
| | | | | | | air |
| WINDOW GLASS | 5 | INF | 156.980 | 0.000 | 5.992 | |
| | | | | | | 1.511 |
| | 6 | INF | 158.760 | 0.000 | 5.717 | |
| | | | | | | air |
| PHOTO-SENSITIVE DRUM | | INF | 238.069 | 0.000 | 0.000 | |

Eccentricity Data

| SURFACE NO. | AXIS | VECTOR | | |
|---|---|---|---|---|
| | | X COMPONENT | Y COMPONENT | Z COMPONENT |
| 5 | X | 0.9882 | 0 | −0.153 |
| | Y | 0 | 1 | 0 |
| 6 | X | 0.9882 | 0 | −0.153 |
| | Y | 0 | 1 | 0 |

TABLE 5

Yellow

Free Curved Surface Data (1st Surface)

| COEFFICIENT OF FREE CURVED SURFACE Cij | | Z |
|---|---|---|
| | | 0 |
| Y | 0 | 0.0000000E+00 |
| | 1 | −1.0327111E−03 |
| | 2 | −7.0492431E−03 |
| | 3 | −1.0081623E−07 |
| | 4 | 3.6860359E−07 |
| | 5 | 1.0431997E−09 |
| | 6 | −1.0949790E−09 |
| | 7 | −5.0179916E−12 |
| | 8 | −2.5413854E−12 |
| | 9 | 6.5096362E−15 |
| | 10 | 4.9500422E−15 |

TABLE 5-continued

Yellow

Free Curved Surface Data (2nd Surface)

| COEFFICIENT OF FREE CURVED SURFACE Cij | | Z |
|---|---|---|
| | | 0 |
| Y | 0 | 0.0000000E+00 |
| | 1 | 0.0000000E+00 |
| | 2 | −1.1193809E−02 |
| | 3 | 0.0000000E+00 |
| | 4 | −5.3450490E−07 |
| | 5 | 0.0000000E+00 |
| | 6 | −4.8778563E−10 |
| | 7 | 0.0000000E+00 |
| | 8 | −2.8114627E−12 |
| | 9 | 0.0000000E+00 |
| | 10 | 2.6552450E−15 |

TABLE 5-continued

Yellow

Free Curved Surface Data (4th Surface)

| COEFFICIENT OF FREE CURVED SURFACE Cij | | Z | | |
|---|---|---|---|---|
| | | 0 | 1 | 2 |
| Y | 0 | 0.0000000E+00 | 5.0677134E−02 | −1.7976904E−02 |
| | 1 | 0.0000000E+00 | −1.3052387E−06 | −3.0568844E−07 |
| | 2 | 6.4584997E−04 | −2.4902568E−06 | 6.9416361E−07 |
| | 3 | 0.0000000E+00 | −9.8529775E−10 | −1.0561608E−10 |
| | 4 | −1.3970867E−07 | 3.0692209E−10 | −8.7207586E−11 |
| | 5 | 0.0000000E+00 | 5.9454441E−13 | 1.5524533E−13 |
| | 6 | 8.9694218E−12 | −2.1456442E−14 | 5.7356430E−15 |
| | 7 | 0.0000000E+00 | −1.2860308E−16 | −3.6567796E−17 |
| | 8 | −5.4695153E−16 | 2.5463201E−19 | 7.2768322E−20 |
| | 9 | 0.0000000E+00 | 9.0197525E−21 | 2.5965817E−21 |
| | 10 | 1.5910163E−20 | 4.7333968E−23 | −2.4640168E−23 |

TABLE 6

Magenta

Free Curved Surface Data (1st Surface)

| COEFFICIENT OF FREE CURVED SURFACE Cij | | Z |
|---|---|---|
| | | 0 |
| Y | 0 | 0.0000000E+00 |
| | 1 | −1.0327111E−03 |
| | 2 | −7.0492431E−03 |
| | 3 | −1.0081623E−07 |
| | 4 | 3.6860359E−07 |
| | 5 | 1.0431997E−09 |
| | 6 | −1.0949790E−09 |
| | 7 | −5.0179916E−12 |
| | 8 | −2.5413854E−12 |
| | 9 | 6.5096362E−15 |
| | 10 | 4.9500422E−15 |

Free Curved Surface Data (2nd Surface)

| COEFFICIENT OF FREE CURVED SURFACE Cij | | Z |
|---|---|---|
| | | 0 |
| Y | 0 | 0.0000000E+00 |
| | 1 | 0.0000000E+00 |
| | 2 | −1.1193809E−02 |
| | 3 | 0.0000000E+00 |
| | 4 | −5.3450490E−07 |
| | 5 | 0.0000000E+00 |
| | 6 | −4.8778563E−10 |
| | 7 | 0.0000000E+00 |
| | 8 | −2.8114627E−12 |
| | 9 | 0.0000000E+00 |
| | 10 | 2.6552450E−15 |

Free Curved Surface Data (4th Surface)

| COEFFICIENT OF FREE CURVED SURFACE Cij | | Z | | |
|---|---|---|---|---|
| | | 0 | 1 | 2 |
| Y | 0 | 0.0000000E+00 | 2.3081718E−02 | −1.7953251E−02 |
| | 1 | 0.0000000E+00 | −5.9284968E−07 | −4.3146635E−07 |
| | 2 | 6.3748776E−04 | −1.0126164E−06 | 7.2028705E−07 |
| | 3 | 0.0000000E+00 | −2.7531479E−10 | 1.8413739E−10 |
| | 4 | −1.3924611E−07 | 1.0907016E−10 | −1.2370308E−10 |
| | 5 | 0.0000000E+00 | 1.6300213E−13 | −1.5492516E−14 |
| | 6 | 8.9063735E−12 | −4.4677119E−16 | 2.1547690E−14 |
| | 7 | 0.0000000E+00 | −3.5318798E−17 | −8.4956895E−19 |
| | 8 | −5.4040847E−16 | −1.4268177E−18 | −2.6506266E−18 |

TABLE 6-continued

Magenta

| | 9 | 0.0000000E+00 | 2.5120439E−21 | 1.8799183E−22 |
|---|---|---|---|---|
| | 10 | 1.5591122E−20 | 1.1414462E−22 | 1.3742692E−22 |

TABLE 7

Cyan

Free Curved Surface Data (1st Surface)

| COEFFICIENT OF FREE CURVED SURFACE Cij | | Z |
|---|---|---|
| | | 0 |
| Y | 0 | 0.0000000E+00 |
| | 1 | −1.0327111E−03 |
| | 2 | −7.0492431E−03 |
| | 3 | −1.0081623E−07 |
| | 4 | 3.6860359E−07 |
| | 5 | 1.0431997E−09 |
| | 6 | −1.0949790E−09 |
| | 7 | −5.0179916E−12 |
| | 8 | −2.5413854E−12 |
| | 9 | 6.5096362E−15 |
| | 10 | 4.9500422E−15 |

Free Curved Surface Data (2nd Surface)

| COEFFICIENT OF FREE CURVED SURFACE Cij | | Z |
|---|---|---|
| | | 0 |
| Y | 0 | 0.0000000E+00 |
| | 1 | 0.0000000E+00 |
| | 2 | −1.1193809E−02 |
| | 3 | 0.0000000E+00 |
| | 4 | −5.3450490E−07 |
| | 5 | 0.0000000E+00 |
| | 6 | −4.8778563E−10 |
| | 7 | 0.0000000E+00 |
| | 8 | −2.8114627E−12 |
| | 9 | 0.0000000E+00 |
| | 10 | 2.6552450E−15 |

Free Curved Surface Data (4th Surface)

| COEFFICIENT OF FREE CURVED SURFACE Cij | | Z | | |
|---|---|---|---|---|
| | | 0 | 1 | 2 |
| Y | 0 | 0.0000000E+00 | −2.0268813E−02 | −1.7952205E−02 |
| | 1 | 0.0000000E+00 | 6.0977294E−07 | −4.4242789E−07 |
| | 2 | 6.3724942E−04 | 1.0369323E−06 | 7.0695088E−07 |
| | 3 | 0.0000000E+00 | 2.4518458E−10 | 2.0461483E−10 |
| | 4 | −1.3864654E−07 | −1.2910907E−10 | −1.0468316E−10 |
| | 5 | 0.0000000E+00 | −1.4530485E−13 | −2.7204843E−14 |
| | 6 | 8.6252214E−12 | 9.7324554E−15 | 1.2877385E−14 |
| | 7 | 0.0000000E+00 | 3.1279414E−17 | 1.9161179E−18 |
| | 8 | −4.9302685E−16 | −2.4511575E−19 | −1.1053230E−18 |
| | 9 | 0.0000000E+00 | −2.1980398E−21 | −4.5157804E−23 |
| | 10 | 1.2945814E−20 | −1.2853233E−23 | 4.3072907E−23 |

TABLE 8

Black

Free Curved Surface Data (1st Surface)

| COEFFICIENT OF FREE CURVED SURFACE Cij | | Z |
|---|---|---|
| | | 0 |
| Y | 0 | 0.0000000E+00 |
| | 1 | −1.0327111E−03 |
| | 2 | −7.0492431E−03 |
| | 3 | −1.0081623E−07 |

TABLE 8-continued

Black

| | |
|---|---|
| 4 | 3.6860359E−07 |
| 5 | 1.0431997E−09 |
| 6 | −1.0949790E−09 |
| 7 | −5.0179916E−12 |
| 8 | −2.5413854E−12 |
| 9 | 6.5096362E−15 |
| 10 | 4.9500422E−15 |

Free Curved Surface Data (2nd Surface)

| COEFFICIENT OF FREE CURVED SURFACE Cij | | Z |
|---|---|---|
| | | 0 |
| Y | 0 | 0.0000000E+00 |
| | 1 | 0.0000000E+00 |
| | 2 | −1.1193809E−02 |
| | 3 | 0.0000000E+00 |
| | 4 | −5.3450490E−07 |
| | 5 | 0.0000000E+00 |
| | 6 | −4.8778563E−10 |
| | 7 | 0.0000000E+00 |
| | 8 | −2.8114627E−12 |
| | 9 | 0.0000000E+00 |
| | 10 | 2.6552450E−15 |

TABLE 8-continued

Black

Free Curved Surface Data (4th Surface)

| COEFFICIENT OF FREE CURVED SURFACE Cij | | Z | | |
|---|---|---|---|---|
| | | 0 | 1 | 2 |
| Y | 0 | 0.0000000E+09 | −5.2374161E−02 | −1.7171218E−02 |
| | 1 | 0.0000000E+00 | 1.4272429E−06 | −4.1076146E−07 |
| | 2 | 6.1554653E−04 | 2.7431513E−06 | 7.6123351E−07 |
| | 3 | 0.0000000E+00 | 1.2391085E−09 | 4.2430351E−10 |
| | 4 | −1.5189529E−07 | −3.3905801E−10 | −1.1833780E−10 |
| | 5 | 0.0000000E+00 | −9.6096297E−13 | −1.8791022E−13 |
| | 6 | 1.1415630E−11 | 1.7056955E−14 | 1.6504310E−14 |
| | 7 | 0.0000000E+00 | 2.7833375E−16 | 3.7844286E−17 |
| | 8 | −8.2598288E−16 | 1.8848505E−18 | −1.7230117E−18 |
| | 9 | 0.0000000E+00 | −2.6294729E−20 | −2.5416911E−21 |
| | 10 | 3.0058140E−20 | −2.3213111E−22 | 8.1746385E−23 |

Tables 9-12 show the construction data regarding the second embodiment, and Tables 13-16 show free curved surface data of the first and second lenses in the respective optical paths.

TABLE 9

Construction Data
Yellow

| NAME | SURFACE NO. | RADIUS OF CURVATURE | COORDINATES OF SURFACE VERTEX | | | REFRACTIVE INDEX |
|---|---|---|---|---|---|---|
| | | | X | Y | Z | |
| FIRST LENS | 1 | FREE | 25.000 | 0.000 | 0.000 | |
| | | | | | | 1.572 |
| | 2 | FREE | 31.000 | 0.000 | 0.000 | |
| | | | | | | air |
| SECOND LENS | 3 | INF | 152.269 | 0.000 | −6.382 | |
| | | | | | | 1.525 |
| | 4 | FREE | 156.269 | 0.000 | −6.382 | |
| | | | | | | air |
| WINDOW GLASS | 5 | INF | 166.269 | 0.000 | −6.382 | |
| | | | | | | 1.511 |
| | 6 | INF | 168.048 | 0.000 | −6.107 | |
| | | | | | | air |
| PHOTO-SENSITIVE DRUM | | INF | 238.069 | 0.000 | 0.000 | |

Eccentricity Data

| SURFACE NO. | AXIS | VECTOR | | |
|---|---|---|---|---|
| | | X COMPONENT | Y COMPONENT | Z COMPONENT |
| 5 | X | 0.9882 | 0 | 0.153 |
| | Y | 0 | 1 | 0 |
| 6 | X | 0.9882 | 0 | 0.153 |
| | Y | 0 | 1 | 0 |

TABLE 10

Construction Data
Mageneta

| NAME | SURFACE NO. | RADIUS OF CURVATURE | COORDINATES OF SURFACE VERTEX | | | REFRACTIVE INDEX |
|---|---|---|---|---|---|---|
| | | | X | Y | Z | |
| FIRST LENS | 1 | FREE | 25.000 | 0.000 | 0.000 | |
| | | | | | | 1.572 |

TABLE 10-continued

| | | | | | | |
|---|---|---|---|---|---|---|
| | 2 | FREE | 31.000 | 0.000 | 0.000 | |
| | | | | | | air |
| SECOND LENS | 3 | INF | 148.969 | 0.000 | −2.600 | |
| | | | | | | 1.525 |
| | 4 | FREE | 152.969 | 0.000 | −2.600 | |
| | | | | | | air |
| WINDOW GLASS | 5 | INF | 162.969 | 0.000 | −2.600 | |
| | | | | | | 1.511 |
| | 6 | INF | 164.748 | 0.000 | −2.876 | |
| | | | | | | air |
| PHOTO-SENSITIVE DRUM | | INF | 238.069 | 0.000 | 0.000 | |

Eccentricity Data

| SURFACE NO. | AXIS | VECTOR | | |
|---|---|---|---|---|
| | | X COMPONENT | Y COMPONENT | Z COMPONENT |
| 5 | X | 0.9882 | 0 | −0.153 |
| | Y | 0 | 1 | 0 |
| 6 | X | 0.9882 | 0 | −0.153 |
| | Y | 0 | 1 | 0 |

TABLE 11

Construction Data
Cyan

| NAME | SURFACE NO. | RADIUS OF CURVATURE | COORDINATES OF SURFACE VERTEX | | | REFRACTIVE INDEX |
|---|---|---|---|---|---|---|
| | | | X | Y | Z | |
| FIRST LENS | 1 | FREE | 25.000 | 0.000 | 0.000 | |
| | | | | | | 1.572 |
| | 2 | FREE | 31.000 | 0.000 | 0.000 | |
| | | | | | | air |
| SECOND LENS | 3 | INF | 145.469 | 0.000 | 2.539 | |
| | | | | | | 1.525 |
| | 4 | FREE | 149.469 | 0.000 | 2.539 | |
| | | | | | | air |
| WINDOW GLASS | 5 | INF | 159.469 | 0.000 | 2.539 | |
| | | | | | | 1.511 |
| | 6 | INF | 161.248 | 0.000 | 2.264 | |
| | | | | | | air |
| PHOTO-SENSITIVE DRUM | | INF | 238.069 | 0.000 | 0.000 | |

Eccentricity Data

| SURFACE NO. | AXIS | VECTOR | | |
|---|---|---|---|---|
| | | X COMPONENT | Y COMPONENT | Z COMPONENT |
| 5 | X | 0.9882 | 0 | −0.153 |
| | Y | 0 | 1 | 0 |
| 6 | X | 0.9882 | 0 | −0.153 |
| | Y | 0 | 1 | 0 |

TABLE 12

Construction Data
Black

| NAME | SURFACE NO. | RADIUS OF CURVATURE | COORDINATES OF SURFACE VERTEX | | | REFRACTIVE INDEX |
|---|---|---|---|---|---|---|
| | | | X | Y | Z | |
| FIRST LENS | 1 | FREE | 25.000 | 0.000 | 0.000 | |
| | | | | | | 1.572 |
| | 2 | FREE | 31.000 | 0.000 | 0.000 | |
| | | | | | | air |

TABLE 12-continued

| | | | | | | |
|---|---|---|---|---|---|---|
| SECOND LENS | 3 | INF | 142.969 | 0.000 | 5.992 | |
| | 4 | FREE | 146.969 | 0.000 | 5.992 | 1.525 |
| | | | | | | air |
| WINDOW GLASS | 5 | INF | 156.969 | 0.000 | 5.992 | |
| | 6 | INF | 158.748 | 0.000 | 5.717 | 1.511 |
| | | | | | | air |
| PHOTO-SENSITIVE DRUM | | INF | 238.069 | 0.000 | 0.000 | |

Eccentricity Data

| SURFACE NO. | AXIS | VECTOR X COMPONENT | Y COMPONENT | Z COMPONENT |
|---|---|---|---|---|
| 5 | X | 0.9882 | 0 | −0.153 |
| | Y | 0 | 1 | 0 |
| 6 | X | 0.9882 | 0 | −0.153 |
| | Y | 0 | 1 | 0 |

TABLE 13

Yellow

Free Curved Surface Data (1st Surface)

| COEFFICIENT OF FREE CURVED SURFACE Cij | | Z 0 |
|---|---|---|
| Y | 0 | 0.0000000E+00 |
| | 1 | −1.0327111E−03 |
| | 2 | −7.0492431E−03 |
| | 3 | −1.0081623E−07 |
| | 4 | 3.6860359E−07 |
| | 5 | 1.0431997E−09 |
| | 6 | −1.0949790E−09 |
| | 7 | −5.0179916E−12 |
| | 8 | −2.5413854E−12 |
| | 9 | 6.5096362E−15 |
| | 10 | 4.9500422E−15 |

Free Curved Surface Data (2nd Surface)

| COEFFICIENT OF FREE CURVED SURFACE Cij | | Z 0 |
|---|---|---|
| Y | 0 | 0.0000000E+00 |
| | 1 | 0.0000000E+00 |
| | 2 | −1.1193809E−02 |
| | 3 | 0.0000000E+00 |
| | 4 | −5.3450490E−07 |
| | 5 | 0.0000000E+00 |
| | 6 | −4.8778563E−10 |
| | 7 | 0.0000000E+00 |
| | 8 | −2.8114627E−12 |
| | 9 | 0.0000000E+00 |
| | 10 | 2.6552450E−15 |

Free Curved Surface Data (4th Surface)

| COEFFICIENT OF FREE CURVED SURFACE Cij | | Z | | |
|---|---|---|---|---|
| | | 0 | 1 | 2 |
| Y | 0 | 0.0000000E+00 | 5.0686487E−02 | −1.7976070E−02 |
| | 1 | 0.0000000E+00 | −1.6075807E−06 | −4.9374783E−07 |
| | 2 | 6.4582398E−04 | −2.4715395E−06 | 7.0177025E−07 |
| | 3 | 0.0000000E+00 | −3.7098626E−10 | 2.7985800E−10 |
| | 4 | −1.3971429E−07 | 2.7806763E−10 | −1.0043984E−10 |
| | 5 | 0.0000000E+00 | 2.6634930E−13 | −5.1809319E−14 |
| | 6 | 8.9734141E−12 | −8.0875838E−15 | 1.2110929E−14 |
| | 7 | 0.0000000E+00 | −6.4756900E−17 | 4.0867673E−18 |
| | 8 | −5.4778757E−16 | −2.1554421E−18 | −1.0931184E−18 |
| | 9 | 0.0000000E+00 | 4.9330387E−21 | −4.0871768E−23 |
| | 10 | 1.5966541E−20 | 1.9653112E−22 | 4.7325640E−23 |

TABLE 14

Magenta

Free Curved Surface Data (1st Surface)

| COEFFICIENT OF FREE CURVED SURFACE Cij | | Z 0 |
|---|---|---|
| Y | 0 | 0.0000000E+00 |
| | 1 | −1.0327111E−03 |
| | 2 | −7.0492431E−03 |
| | 3 | −1.0081623E−07 |
| | 4 | 3.6860359E−07 |
| | 5 | 1.0431997E−09 |
| | 6 | −1.0949790E−09 |
| | 7 | −5.0179916E−12 |
| | 8 | −2.5413854E−12 |
| | 9 | 6.5096362E−15 |
| | 10 | 4.9500422E−15 |

Free Curved Surface Data (2nd Surface)

| COEFFICIENT OF FREE CURVED SURFACE Cij | | Z 0 |
|---|---|---|
| Y | 0 | 0.0000000E+00 |
| | 1 | 0.0000000E+00 |
| | 2 | −1.1193809E−02 |
| | 3 | 0.0000000E+00 |
| | 4 | −5.3450490E−07 |
| | 5 | 0.0000000E+00 |
| | 6 | −4.8778563E−10 |
| | 7 | 0.0000000E+00 |
| | 8 | −2.8114627E−12 |
| | 9 | 0.0000000E+00 |
| | 10 | 2.6552450E−15 |

TABLE 14-continued

Magenta

Free Curved Surface Data (4th Surface)

| COEFFICIENT OF FREE CURVED SURFACE Cij | | Z | |
|---|---|---|---|
| | | 0 | 1 | 2 |
| Y | 0 | 0.0000000E+00 | 2.3268213E−02 | −1.7631880E−02 |
| | 1 | 0.0000000E+00 | −5.8702190E−07 | −4.2949215E−07 |
| | 2 | 6.2569853E−04 | −1.0565377E−06 | 7.3557414E−07 |
| | 3 | 0.0000000E+00 | −3.2368289E−10 | 2.0060688E−10 |
| | 4 | −1.4316440E−07 | 1.2621746E−10 | −1.2268484E−10 |
| | 5 | 0.0000000E+00 | 1.8940940E−13 | −2.2693246E−14 |
| | 6 | 9.6970619E−12 | −5.6483435E−15 | 1.9779780E−14 |
| | 7 | 0.0000000E+00 | −4.1468622E−17 | 8.2295981E−19 |
| | 8 | −6.2638689E−16 | −6.9770242E−19 | −2.3037634E−18 |
| | 9 | 0.0000000E+00 | 2.9937265E−21 | −3.5065945E−23 |
| | 10 | 1.9678619E−20 | 7.7968842E−23 | 1.1684991E−22 |

TABLE 15

Cyan

Free Curved Surface Data (1st Surface)

| COEFFICIENT OF FREE CURVED SURFACE Cij | | Z |
|---|---|---|
| | | 0 |
| Y | 0 | 0.0000000E+00 |
| | 1 | −1.0327111E−03 |
| | 2 | −7.0492431E−03 |
| | 3 | −1.0081623E−07 |
| | 4 | 3.6860359E−07 |
| | 5 | 1.0431997E−09 |
| | 6 | −1.0949790E−09 |
| | 7 | −5.0179916E−12 |
| | 8 | −2.5413854E−12 |
| | 9 | 6.5096362E−15 |
| | 10 | 4.9500422E−15 |

Free Curved Surface Data (2nd Surface)

| COEFFICIENT OF FREE CURVED SURFACE Cij | | Z |
|---|---|---|
| | | 0 |
| Y | 0 | 0.0000000E+00 |
| | 1 | 0.0000000E+00 |
| | 2 | −1.1193809E−02 |
| | 3 | 0.0000000E+00 |
| | 4 | −5.3450490E−07 |
| | 5 | 0.0000000E+00 |
| | 6 | −4.8778563E−10 |
| | 7 | 0.0000000E+00 |
| | 8 | −2.8114627E−12 |
| | 9 | 0.0000000E+00 |
| | 10 | 2.6552450E−15 |

Free Curved Surface Data (4th Surface)

| COEFFICIENT OF FREE CURVED SURFACE Cij | | Z | | |
|---|---|---|---|---|
| | | 0 | 1 | 2 |
| Y | 0 | 0.0000000E+00 | −2.0905782E−02 | −1.7332958E−02 |
| | 1 | 0.0000000E+00 | 5.8592517E−07 | −4.2776349E−07 |
| | 2 | 6.1462080E−04 | 1.1173558E−06 | 7.4183005E−07 |
| | 3 | 0.0000000E+00 | 3.7786605E−10 | 2.1712157E−10 |

TABLE 15-continued

Cyan

| | 4 | −1.4785733E−07 | −1.4623013E−10 | −1.0973095E−10 |
|---|---|---|---|---|
| | 5 | 0.0000000E+00 | −2.2350502E−13 | −2.7927960E−14 |
| | 6 | 1.0655427E−11 | 1.2174858E−14 | 1.2905781E−14 |
| | 7 | 0.0000000E+00 | 5.0470536E−17 | 1.4858887E−18 |
| | 8 | −7.3751773E−16 | −3.3317194E−19 | −1.0555110E−18 |
| | 9 | 0.0000000E+00 | −3.7848260E−21 | 1.0981481E−23 |
| | 10 | 2.5345705E−20 | −1.9701298E−23 | 4.0732082E−23 |

TABLE 16

Black

Free Curved Surface Data (1st Surface)

| COEFFICIENT OF FREE CURVED SURFACE Cij | | Z |
|---|---|---|
| | | 0 |
| Y | 0 | 0.0000000E+00 |
| | 1 | −1.0327111E−03 |
| | 2 | −7.0492431E−03 |
| | 3 | −1.0081623E−07 |
| | 4 | 3.6860359E−07 |
| | 5 | 1.0431997E−09 |
| | 6 | −1.0949790E−09 |
| | 7 | −5.0179916E−12 |
| | 8 | −2.5413854E−12 |
| | 9 | 6.5096362E−15 |
| | 10 | 4.9500422E−15 |

Free Curved Surface Data (2nd Surface)

| COEFFICIENT OF FREE CURVED SURFACE Cij | | Z |
|---|---|---|
| | | 0 |
| Y | 0 | 0.0000000E+00 |
| | 1 | 0.0000000E+00 |
| | 2 | −1.1193809E−02 |
| | 3 | 0.0000000E+00 |
| | 4 | −5.3450490E−07 |
| | 5 | 0.0000000E+00 |
| | 6 | −4.8778563E−10 |
| | 7 | 0.0000000E+00 |
| | 8 | −2.8114627E−12 |
| | 9 | 0.0000000E+00 |
| | 10 | 2.6552450E−15 |

Free Curved Surface Data (4th Surface)

| COEFFICIENT OF FREE CURVED SURFACE Cij | | Z | | |
|---|---|---|---|---|
| | | 0 | 1 | 2 |
| Y | 0 | 0.0000000E+00 | −5.2372035E−02 | −1.7173316E−02 |
| | 1 | 0.0000000E+00 | 1.2861691E−06 | −3.5097553E−07 |
| | 2 | 6.1581891E−04 | 2.7692947E−06 | 7.6773839E−07 |
| | 3 | 0.0000000E+00 | 1.3803500E−09 | 1.0130824E−11 |
| | 4 | −1.5211809E−07 | −3.8115870E−10 | −1.2138232E−10 |
| | 5 | 0.0000000E+00 | −8.8917395E−13 | 1.3121479E−13 |
| | 6 | 1.1512048E−11 | 3.7833278E−14 | 1.6539804E−14 |
| | 7 | 0.0000000E+00 | 2.1864626E−16 | −4.2207630E−17 |
| | 8 | −8.4245936E−16 | −2.0713989E−18 | −1.6170927E−18 |
| | 9 | 0.0000000E+00 | −1.7953573E−20 | 3.9700659E−21 |
| | 10 | 3.1044847E−20 | 2.3741187E−23 | 7.2924077E−23 |

Tables 17-20 show the construction data of the scanning optical system wherein Ly<Lm<Lc<Lk, and Tables 21-24 show free curved surface data of the first and second lenses in the respective optical paths.

TABLE 17

Construction Data
Yellow

| NAME | SURFACE NO. | RADIUS OF CURVATURE | COORDINATES OF SURFACE VERTEX | | | REFRACTIVE INDEX |
| --- | --- | --- | --- | --- | --- | --- |
| | | | X | Y | Z | |
| FIRST LENS | 1 | FREE | 25.000 | 0.000 | 0.000 | |
| | | | | | | 1.572 |
| | 2 | FREE | 31.000 | 0.000 | 0.000 | |
| | | | | | | air |
| SECOND LENS | 3 | INF | 152.269 | 0.000 | −6.382 | |
| | | | | | | 1.525 |
| | 4 | FREE | 156.269 | 0.000 | −6.382 | |
| | | | | | | air |
| WINDOW GLASS | 5 | INF | 166.269 | 0.000 | −6.382 | |
| | | | | | | 1.511 |
| | 6 | INF | 168.048 | 0.000 | −6.107 | |
| | | | | | | air |
| PHOTO-SENSITIVE DRUM | | INF | 238.069 | 0.000 | 0.000 | |

Eccentricity Data

| SURFACE NO. | AXIS | VECTOR | | |
| --- | --- | --- | --- | --- |
| | | X COMPONENT | Y COMPONENT | Z COMPONENT |
| 5 | X | 0.9882 | 0 | 0.153 |
| | Y | 0 | 1 | 0 |
| 6 | X | 0.9882 | 0 | 0.153 |
| | Y | 0 | 1 | 0 |

TABLE 18

Construction Data
Mageneta

| NAME | SURFACE NO. | RADIUS OF CURVATURE | COORDINATES OF SURFACE VERTEX | | | REFRACTIVE INDEX |
| --- | --- | --- | --- | --- | --- | --- |
| | | | X | Y | Z | |
| FIRST LENS | 1 | FREE | 25.000 | 0.000 | 0.000 | |
| | | | | | | 1.572 |
| | 2 | FREE | 31.000 | 0.000 | 0.000 | |
| | | | | | | air |
| SECOND LENS | 3 | INF | 145.469 | 0.000 | −2.539 | |
| | | | | | | 1.525 |
| | 4 | FREE | 149.469 | 0.000 | −2.539 | |
| | | | | | | air |
| WINDOW GLASS | 5 | INF | 159.469 | 0.000 | −2.539 | |
| | | | | | | 1.511 |
| | 6 | INF | 161.248 | 0.000 | −2.815 | |
| | | | | | | air |
| PHOTO-SENSITIVE DRUM | | INF | 238.069 | 0.000 | 0.000 | |

Eccentricity Data

| SURFACE NO. | AXIS | VECTOR | | |
| --- | --- | --- | --- | --- |
| | | X COMPONENT | Y COMPONENT | Z COMPONENT |
| 5 | X | 0.9882 | 0 | −0.153 |
| | Y | 0 | 1 | 0 |
| 6 | X | 0.9882 | 0 | −0.153 |
| | Y | 0 | 1 | 0 |

TABLE 19

Construction Data
Cyan

| NAME | SURFACE NO. | RADIUS OF CURVATURE | COORDINATES OF SURFACE VERTEX | | | REFRACTIVE INDEX |
|---|---|---|---|---|---|---|
| | | | X | Y | Z | |
| FIRST LENS | 1 | FREE | 25.000 | 0.000 | 0.000 | |
| | | | | | | 1.572 |
| | 2 | FREE | 31.000 | 0.000 | 0.000 | |
| | | | | | | air |
| SECOND LENS | 3 | INF | 148.969 | 0.000 | 2.600 | |
| | | | | | | 1.525 |
| | 4 | FREE | 152.969 | 0.000 | 2.600 | |
| | | | | | | air |
| WINDOW GLASS | 5 | INF | 162.969 | 0.000 | 2.600 | |
| | | | | | | 1.511 |
| | 6 | INF | 164.748 | 0.000 | 2.325 | |
| | | | | | | air |
| PHOTO-SENSITIVE DRUM | | INF | 238.069 | 0.000 | 0.000 | |

Eccentricity Data

| SURFACE NO. | AXIS | VECTOR | | |
|---|---|---|---|---|
| | | X COMPONENT | Y COMPONENT | Z COMPONENT |
| 5 | X | 0.9882 | 0 | −0.153 |
| | Y | 0 | 1 | 0 |
| 6 | X | 0.9882 | 0 | −0.153 |
| | Y | 0 | 1 | 0 |

TABLE 20

Construction Data
Black

| NAME | SURFACE NO. | RADIUS OF CURVATURE | COORDINATES OF SURFACE VERTEX | | | REFRACTIVE INDEX |
|---|---|---|---|---|---|---|
| | | | X | Y | Z | |
| FIRST LENS | 1 | FREE | 25.000 | 0.000 | 0.000 | |
| | | | | | | 1.572 |
| | 2 | FREE | 31.000 | 0.000 | 0.000 | |
| | | | | | | air |
| SECOND LENS | 3 | INF | 142.969 | 0.000 | 5.992 | |
| | | | | | | 1.525 |
| | 4 | FREE | 146.969 | 0.000 | 5.992 | |
| | | | | | | air |
| WINDOW GLASS | 5 | INF | 156.969 | 0.000 | 5.992 | |
| | | | | | | 1.511 |
| | 6 | INF | 164.748 | 0.000 | 5.717 | |
| | | | | | | air |
| PHOTO-SENSITIVE DRUM | | INF | 238.069 | 0.000 | 0.000 | |

Eccentricity Data

| SURFACE NO. | AXIS | VECTOR | | |
|---|---|---|---|---|
| | | X COMPONENT | Y COMPONENT | Z COMPONENT |
| 5 | X | 0.9882 | 0 | −0.153 |
| | Y | 0 | 1 | 0 |
| 6 | X | 0.9882 | 0 | −0.153 |
| | Y | 0 | 1 | 0 |

TABLE 21

Yellow

Free Curved Surface Data (1st Surface)

| COEFFICIENT OF FREE CURVED SURFACE Cij | | Z<br>0 |
|---|---|---|
| Y | 0 | 0.0000000E+00 |
|   | 1 | −1.0327111E−03 |
|   | 2 | −7.0492431E−03 |
|   | 3 | −1.0081623E−07 |
|   | 4 | 3.6860359E−07 |
|   | 5 | 1.0431997E−09 |
|   | 6 | −1.0949790E−09 |
|   | 7 | −5.0179916E−12 |
|   | 8 | −2.5413854E−12 |
|   | 9 | 6.5096362E−15 |
|   | 10 | 4.9500422E−15 |

Free Curved Surface Data (2nd Surface)

| COEFFICIENT OF FREE CURVED SURFACE Cij | | Z<br>0 |
|---|---|---|
| Y | 0 | 0.0000000E+00 |
|   | 1 | 0.0000000E+00 |
|   | 2 | −1.1193809E−02 |
|   | 3 | 0.0000000E+00 |
|   | 4 | −5.3450490E−07 |
|   | 5 | 0.0000000E+00 |
|   | 6 | −4.8778563E−10 |
|   | 7 | 0.0000000E+00 |
|   | 8 | −2.8114627E−12 |
|   | 9 | 0.0000000E+00 |
|   | 10 | 2.6552450E−15 |

Free Curved Surface Data (4th Surface)

| COEFFICIENT OF FREE CURVED SURFACE Cij | | Z | | |
|---|---|---|---|---|
|   |   | 0 | 1 | 2 |
| Y | 0 | 0.0000000E+00 | 5.0728969E−02 | −1.7975061E−02 |
|   | 1 | 0.0000000E+00 | −1.4222689E−06 | −4.4091097E−07 |
|   | 2 | 6.4582905E−04 | −2.4877449E−06 | 6.8213677E−07 |
|   | 3 | 0.0000000E+00 | −7.0500204E−10 | 1.7093658E−10 |
|   | 4 | −1.3971267E−07 | 3.0185042E−10 | −7.4376929E−11 |
|   | 5 | 0.0000000E+00 | 4.3533610E−13 | 6.9867392E−15 |
|   | 6 | 8.9719204E−12 | −1.9409591E−14 | 8.7070526E−16 |
|   | 7 | 0.0000000E+00 | −9.7293476E−17 | −7.6624055E−18 |
|   | 8 | −5.4744752E−16 | −8.5768201E−20 | 8.3112947E−19 |
|   | 9 | 0.0000000E+00 | 7.0546805E−21 | 7.4295205E−22 |
|   | 10 | 1.5943542E−20 | 7.0441763E−23 | −6.6151456E−23 |

TABLE 22

Magenta

Free Curved Surface Data (1st Surface)

| COEFFICIENT OF FREE CURVED SURFACE Cij | | Z<br>0 |
|---|---|---|
| Y | 0 | 0.0000000E+00 |
|   | 1 | −1.0327111E−03 |
|   | 2 | −7.0492431E−03 |
|   | 3 | −1.0081623E−07 |
|   | 4 | 3.6860359E−07 |
|   | 5 | 1.0431997E−09 |
|   | 6 | −1.0949790E−09 |
|   | 7 | −5.0179916E−12 |
|   | 8 | −2.5413854E−12 |

TABLE 22-continued

Magenta

|   | 9 | 6.5096362E−15 |
|---|---|---|
|   | 10 | 4.9500422E−15 |

Free Curved Surface Data (2nd Surface)

| COEFFICIENT OF FREE CURVED SURFACE Cij | | Z<br>0 |
|---|---|---|
| Y | 0 | 0.0000000E+00 |
|   | 1 | 0.0000000E+00 |
|   | 2 | −1.1193809E−02 |
|   | 3 | 0.0000000E+00 |
|   | 4 | −5.3450490E−07 |
|   | 5 | 0.0000000E+00 |
|   | 6 | −4.8778563E−10 |
|   | 7 | 0.0000000E+00 |
|   | 8 | −2.8114627E−12 |
|   | 9 | 0.0000000E+00 |
|   | 10 | 2.6552450E−15 |

Free Curved Surface Data (4th Surface)

| COEFFICIENT OF FREE CURVED SURFACE Cij | | Z | | |
|---|---|---|---|---|
|   |   | 0 | 1 | 2 |
| Y | 0 | 0.0000000E+00 | 2.3467782E−02 | −1.7333470E−02 |
|   | 1 | 0.0000000E+00 | −5.7378095E−07 | −3.9354259E−07 |
|   | 2 | 6.1463321E−04 | −1.1047757E−06 | 7.4568089E−07 |
|   | 3 | 0.0000000E+00 | −4.0473658E−10 | 1.5378721E−10 |
|   | 4 | −1.4792261E−07 | 1.4226641E−10 | −1.1452809E−10 |
|   | 5 | 0.0000000E+00 | 2.4102186E−13 | 8.0323778E−15 |
|   | 6 | 1.0681857E−11 | −1.0221367E−14 | 1.4990896E−14 |
|   | 7 | 0.0000000E+00 | −5.4744084E−17 | −6.4290635E−18 |
|   | 8 | −7.4150990E−16 | −4.7158919E−20 | −1.4220845E−18 |
|   | 9 | 0.0000000E+00 | 4.1346627E−21 | 6.1011624E−22 |
|   | 10 | 2.5560668E−20 | 4.4387568E−23 | 6.3443730E−23 |

TABLE 23

Cyan

Free Curved Surface Data (1st Surface)

| COEFFICIENT OF FREE CURVED SURFACE Cij | | Z<br>0 |
|---|---|---|
| Y | 0 | 0.0000000E+00 |
|   | 1 | −1.0327111E−03 |
|   | 2 | −7.0492431E−03 |
|   | 3 | −1.0081623E−07 |
|   | 4 | 3.6860359E−07 |
|   | 5 | 1.0431997E−09 |
|   | 6 | −1.0949790E−09 |
|   | 7 | −5.0179916E−12 |
|   | 8 | −2.5413854E−12 |
|   | 9 | 6.5096362E−15 |
|   | 10 | 4.9500422E−15 |

Free Curved Surface Data (2nd Surface)

| COEFFICIENT OF FREE CURVED SURFACE Cij | | Z<br>0 |
|---|---|---|
| Y | 0 | 0.0000000E+00 |
|   | 1 | 0.0000000E+00 |
|   | 2 | −1.1193809E−02 |
|   | 3 | 0.0000000E+00 |
|   | 4 | −5.3450490E−07 |
|   | 5 | 0.0000000E+00 |
|   | 6 | −4.8778563E−10 |
|   | 7 | 0.0000000E+00 |

TABLE 23-continued

Cyan

| | | |
|---|---|---|
| 8 | | −2.8114627E−12 |
| 9 | | 0.0000000E+00 |
| 10 | | 2.6552450E−15 |

Free Curved Surface Data (4th Surface)

| COEFFICIENT OF FREE CURVED SURFACE Cij | | Z | |
|---|---|---|---|
| | | 0 | 1 | 2 |

| | | | | |
|---|---|---|---|---|
| Y | 0 | 0.0000000E+00 | −2.0614337E−02 | −1.7630086E−02 |
| | 1 | 0.0000000E+00 | 5.7907970E−07 | −4.5878902E−07 |
| | 2 | 6.2573714E−04 | 1.0712671E−06 | 7.2120912E−07 |
| | 3 | 0.0000000E+00 | 3.5828368E−10 | 2.1060104E−10 |
| | 4 | −1.4316455E−07 | −1.3114767E−10 | −1.0433867E−10 |
| | 5 | 0.0000000E+00 | −2.1818992E−13 | −7.4050863E−15 |
| | 6 | 9.6966564E−12 | 8.0890829E−15 | 1.1669686E−14 |
| | 7 | 0.0000000E+00 | 4.9294597E−17 | −5.9606392E−18 |
| | 8 | −6.2627021E−16 | 2.1552315E−19 | −8.6684216E−19 |
| | 9 | 0.0000000E+00 | −3.6542854E−21 | 7.1935142E−22 |
| | 10 | 1.9670021E−20 | −4.6885606E−23 | 2.9267529E−23 |

TABLE 24

Black

Free Curved Surface Data (1st Surface)

| COEFFICIENT OF FREE CURVED SURFACE Cij | | Z |
|---|---|---|
| | | 0 |

| | | |
|---|---|---|
| Y | 0 | 0.0000000E+00 |
| | 1 | −1.0327111E−03 |
| | 2 | −7.0492431E−03 |
| | 3 | −1.0081623E−07 |
| | 4 | 3.6860359E−07 |
| | 5 | 1.0431997E−09 |
| | 6 | −1.0949790E−09 |
| | 7 | −5.0179916E−12 |
| | 8 | −2.5413854E−12 |
| | 9 | 6.5096362E−15 |
| | 10 | 4.9500422E−15 |

Free Curved Surface Data (2nd Surface)

| COEFFICIENT OF FREE CURVED SURFACE Cij | | Z |
|---|---|---|
| | | 0 |

| | | |
|---|---|---|
| Y | 0 | 0.0000000E+00 |
| | 1 | 0.0000000E+00 |
| | 2 | −1.1193809E−02 |
| | 3 | 0.0000000E+00 |
| | 4 | −5.3450490E−07 |
| | 5 | 0.0000000E+00 |
| | 6 | −4.8778563E−10 |
| | 7 | 0.0000000E+00 |
| | 8 | −2.8114627E−12 |
| | 9 | 0.0000000E+00 |
| | 10 | 2.6552450E−15 |

Free Curved Surface Data (4th Surface)

| COEFFICIENT OF FREE CURVED SURFACE Cij | | Z | | |
|---|---|---|---|---|
| | | 0 | 1 | 2 |

| | | | | |
|---|---|---|---|---|
| Y | 0 | 0.0000000E+00 | −5.2377840E−02 | −1.7172330E−02 |
| | 1 | 0.0000000E+00 | 1.3638960E−06 | −4.1958064E−07 |
| | 2 | 6.1582872E−04 | 2.7732454E−06 | 7.6038713E−07 |
| | 3 | 0.0000000E+00 | 1.1484141E−09 | 1.7571497E−10 |

TABLE 24-continued

Black

| | | | |
|---|---|---|---|
| 4 | −1.5212252E−07 | −3.8743556E−10 | −1.1208080E−10 |
| 5 | 0.0000000E+00 | −7.1118865E−13 | 1.9101781E−14 |
| 6 | 1.1513758E−11 | 4.1055304E−14 | 1.2385355E−14 |
| 7 | 0.0000000E+00 | 1.6852573E−16 | −1.2819896E−17 |
| 8 | −8.4272524E−16 | −2.7093535E−18 | −8.6247127E−19 |
| 9 | 0.0000000E+00 | −1.3226136E−20 | 1.2897199E−21 |
| 10 | 3.1059125E−20 | 6.6120555E−23 | 2.5462954E−23 |

Other Embodiments

Each of the first lens and the second lenses may be composed of a plural number of lenses. Each of the exclusive optical elements, of which one surface is not plane, is not limited to a lens. Also, the arrangement and the structure of the plane mirrors may be arbitrarily designed. Further, the arrangement of the image forming units may be arbitrarily designed, and it is not necessarily required to locate the black image forming unit in the left end. Although the present invention has been described in connection with the embodiments above, it is to be noted that various changes and modifications are possible to those who are skilled in the art. Such changes and modifications are to be understood as being within the scope of the present invention.

What is claimed is:

1. A laser scanning optical apparatus wherein a plural number of beams are deflected by a single deflector and scanned on corresponding receiving surfaces of respective photosensitive drums, via a scanning optical system, wherein:
    the scanning optical system comprises exclusive optical elements for exclusively transmitting respective ones of the beams, the exclusive optical elements positioned in an end portion of the scanning optical system, such that each respective beam is transmitted directly from respective ones of the exclusive optical elements to respective photosensitive drums, each of the exclusive optical elements having at least one non-plane surface; and
    the exclusive optical elements are located such that at least one of the exclusive optical elements is at a distance from the receiving surface on which the beam transmitted by the at least one of the exclusive optical elements is scanned and that another of the exclusive optical elements is at another distance from the receiving surface on which the beam transmitted by the another of the exclusive optical elements is scanned.

2. A laser scanning optical apparatus according to claim 1, wherein the exclusive optical elements have powers mainly in a sub-scanning direction.

3. A laser scanning optical apparatus according to claim 1, wherein the exclusive optical elements are located such that at least one of the exclusive optical elements is at a distance from the receiving surface on which the beam transmitted by the at least one of the exclusive elements is scanned and that the other exclusive optical elements are at another distance from the respective receiving surfaces on which the beams transmitted respectively by the other exclusive optical elements are scanned.

4. A laser scanning optical apparatus according to claim 1, wherein the exclusive optical elements are located such that the exclusive optical elements are at mutually different distances from the respective receiving surfaces on which the beams transmitted respectively by the exclusive optical elements are scanned.

5. A laser scanning optical apparatus according to claim 4, wherein the distances between the exclusive optical elements and the respective receiving surfaces are increasing or decreasing in a direction in which the receiving surfaces are arranged.

6. A laser scanning optical apparatus according to claim 1, wherein a case holding the scanning optical system has a bearing surface to be fitted to an image forming apparatus body, the bearing surface tilting from a plane including axes of the receiving surfaces.

* * * * *